US012689708B2

(12) United States Patent
Nguyen

(10) Patent No.: US 12,689,708 B2
(45) Date of Patent: *Jul. 21, 2026

(54) DYNAMIC LIGHTING LEVEL ADJUSTMENT FOR VIRTUAL BACKGROUNDS

(71) Applicant: Zoom Communications, Inc., San Jose, CA (US)

(72) Inventor: Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/391,073

(22) Filed: Dec. 20, 2023

(65) Prior Publication Data

US 2024/0121354 A1 Apr. 11, 2024

Related U.S. Application Data

(63) Continuation of application No. 17/579,756, filed on Jan. 20, 2022, now Pat. No. 11,895,438.

(51) Int. Cl.
| | |
|---|---|
| *H04N 7/15* | (2006.01) |
| *G06V 10/141* | (2022.01) |
| *G06V 10/60* | (2022.01) |
| *H04L 12/18* | (2006.01) |

(Continued)

(52) U.S. Cl.
CPC ............. *H04N 7/15* (2013.01); *G06V 10/141* (2022.01); *G06V 10/60* (2022.01); *H04L 12/1822* (2013.01); *H04N 23/71* (2023.01); *H04N 23/74* (2023.01)

(58) Field of Classification Search
CPC .......... H04N 7/15; H04N 23/71; H04N 23/74; H04N 7/147; H04N 7/152; H04N 23/611; H04N 23/617; G06V 10/141; G06V 10/60; G06V 10/54; G06V 20/46; G06V 40/168;

(Continued)

(56) References Cited

U.S. PATENT DOCUMENTS

| | | | |
|---|---|---|---|
| 5,345,313 | A | 9/1994 | Blank |
| 6,122,013 | A | 9/2000 | Tamir et al. |
| 7,999,862 | B2 | 8/2011 | Mack et al. |

(Continued)

OTHER PUBLICATIONS

Match Lighting for Composites with this Secret Tool., Aaron Nace, https://phlearn.com/tutorial/match-lighting-any-composite/, Oct. 9, 2018, 6 pages.

*Primary Examiner* — Stella L. Woo
(74) *Attorney, Agent, or Firm* — Young Basile Hanlon & MacFarlane, P.C.

(57) ABSTRACT

A system can automatically adjust a virtual background used by a participant in a video conference to match lighting level conditions present in a foreground of a participant video stream captured at a participant device. The matching can be done by adjusting one or more virtual background parameters, including but not limited to, exposure, brightness, contrast, and ISO. In some implementations, the system can dynamically or automatically adjust the lighting levels of the virtual background based on changes that may occur to the lighting level of the foreground during the video conference.

20 Claims, 8 Drawing Sheets

(51) Int. Cl.
  *H04N 23/71*         (2023.01)
  *H04N 23/74*         (2023.01)

(58) Field of Classification Search
  CPC .... G06V 10/82; G06V 10/25; H04L 12/1822;
                    H04L 51/10; H04L 12/1827
  See application file for complete search history.

(56)                  References Cited

U.S. PATENT DOCUMENTS

| | | | |
|---|---|---|---|
| 9,883,141 B1 | 1/2018 | Breedvelt-Schouten et al. | |
| 11,895,438 B2 * | 2/2024 | Nguyen | G06V 10/25 |
| 2007/0279427 A1 | 12/2007 | Marks | |
| 2012/0243200 A1 | 9/2012 | Sutton et al. | |
| 2012/0300011 A1 | 11/2012 | Moletti et al. | |
| 2014/0085398 A1 * | 3/2014 | Tian | H04N 7/15 |
| | | | 348/14.01 |
| 2014/0098263 A1 * | 4/2014 | Kobuna | H04N 23/71 |
| | | | 348/234 |
| 2014/0139609 A1 * | 5/2014 | Lu | G06T 11/60 |
| | | | 348/14.03 |
| 2016/0088707 A1 | 3/2016 | Van De Sluis et al. | |
| 2019/0007623 A1 | 1/2019 | Wang et al. | |
| 2019/0080508 A1 * | 3/2019 | Johnson | H04N 23/631 |
| 2020/0226729 A1 * | 7/2020 | Zhang | G06T 7/521 |
| 2021/0118404 A1 | 4/2021 | Bartscherer et al. | |
| 2021/0195087 A1 * | 6/2021 | Peng | G06T 7/001 |
| 2022/0159166 A1 | 5/2022 | Files et al. | |
| 2022/0232189 A1 | 7/2022 | Swierk et al. | |
| 2022/0262326 A1 | 8/2022 | Sommerlade et al. | |
| 2024/0282020 A1 * | 8/2024 | Williams | G06T 7/90 |

* cited by examiner

DYNAMIC LIGHTING LEVEL ADJUSTMENT FOR VIRTUAL BACKGROUNDS

CROSS-REFERENCE TO RELATED APPLICATION(S)

This application is a continuation of U.S. patent application Ser. No. 17/579,756, filed Jan. 20, 2022, the entire disclosure of which is hereby incorporated by reference.

FIELD

This disclosure relates to communication services. More specifically, this disclosure relates to automatically adjusting a lighting level of a virtual background based on a lighting level for a participant in a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
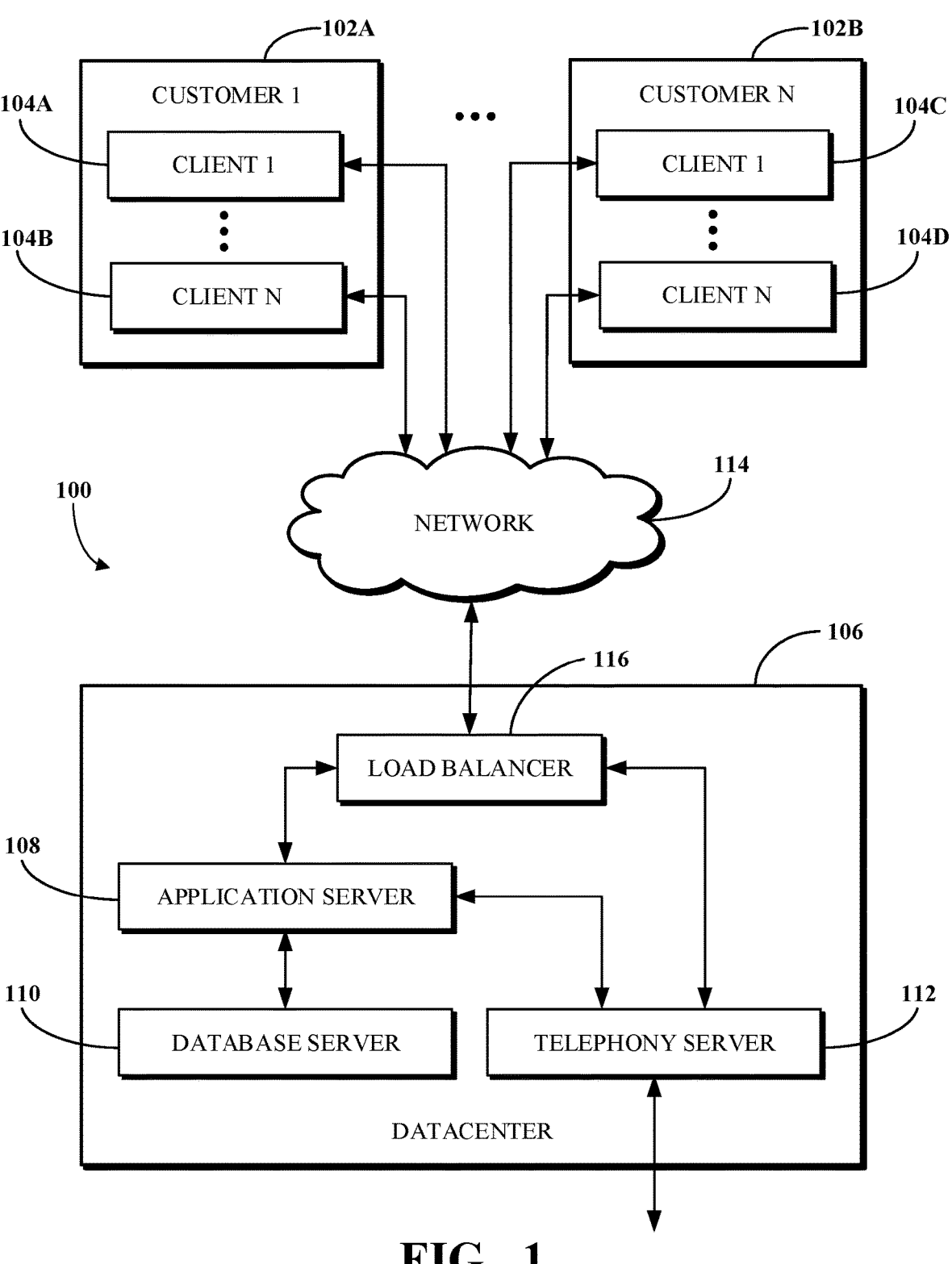
FIG. 1 is a block diagram of an example of an electronic computing and communications system.

Users of conferencing software, referred to as conference participants when participating in a conference implemented over conferencing software, enjoy using virtual backgrounds. A virtual background is a virtual image which is used in place of the actual background of the conference participant. The virtual background may be selected by the conference participant within a client-side conferencing software (e.g., a conferencing software that is included in an application executable on a conference participant device) or may be pre-selected for the conference participant (such as by an employer of the conference participant). For example, virtual backgrounds provide privacy to the conference participants using them and are aesthetically pleasing to other conference participants. In some instances, virtual backgrounds may be required, such as in accordance with a company's privacy policies or otherwise for security purposes.

However, the quality of video output during a conference is important to many conference participants, and the use of a virtual background may affect the overall quality of a video stream that uses the virtual background. In particular, because virtual backgrounds are generally static images, they are typically not optimized for lighting conditions within an environment in which a subject conference participant is located during the conference. Thus, in some cases, the representation of a conference participant within a video stream may be over or under exposed (i.e., too bright or too dark) relative to the virtual background added to that video stream when it is output for rendering by the conferencing software, or vice versa. For example, if the conference participant has too much light (i.e., is over exposed) and the virtual background is not corrected (e.g., by darkening), the background can appear washed out. In another example, if the conference participant does not have enough light (i.e., is under exposed) and the virtual background is not corrected (e.g., by lightening), the background may overpower the subject within the video. The manual correction of a virtual background during a conference would be highly disruptive to the subject. Furthermore, these lighting differences between the subject and his or her virtual background can be distracting to others participating in the conference or at least noticeably affect the quality of the conference video. This can result in an unappealing environment for having the video conference, which in turn may lead to unwanted outcomes with respect to the substance of the video call. For example, a dark background may provide an unwelcome somber tone to the video conference.

An approach to resolve this issue is to use expensive cameras that have larger sensors and wider aperture stops. However, many conference participants rely upon cameras built into their devices for ease and convenience. Consequently, this approach introduces considerable barriers to accessibility. While a software solution for the automatic correction of lighting conditions for a virtual background would be desirable, conventional conferencing software services do not have mechanisms for automatically correcting the lighting conditions for a virtual background.

Implementations of this disclosure address problems such as these using client-side or server-side software for automatically adjusting a virtual background used by a participant in a video conference to match lighting conditions present in a foreground of a participant video stream captured at a participant device. The matching can be done by adjusting one or more virtual background parameters, including but not limited to, exposure, brightness, contrast, and ISO level. In some implementations, the adjustments to the virtual background can be done dynamically or automatically based on any changed lighting conditions that may occur during the video conference. In some implementations, a client-side of a system can perform the automatic adjustment of the virtual background. In some implementations, a server-side of a system can perform the automatic adjustment of the virtual background.

In some implementations, a virtual background auto-correction system provides real-time adjustments of the background lighting information according to foreground lighting information during a video conference. These real-time adjustments include, but are not limited to, performing auto-exposure correction (e.g., adjusting ISO, colors, brightness, and/or contrast) for a virtual background, provided by the user or the conferencing software, to match the exposure or lighting level settings of the virtual background to those of the participants or subjects (i.e., the foreground) of the video stream.

To describe some implementations in greater detail, reference is first made to examples of hardware and software structures used to implement a system for auto-correction of virtual backgrounds. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a unified communications as a service (UCaaS) platform. Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a UCaaS platform, which includes several communications services integrated over a network, such as the Internet, to deliver a complete communication experience regardless of physical location.

Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
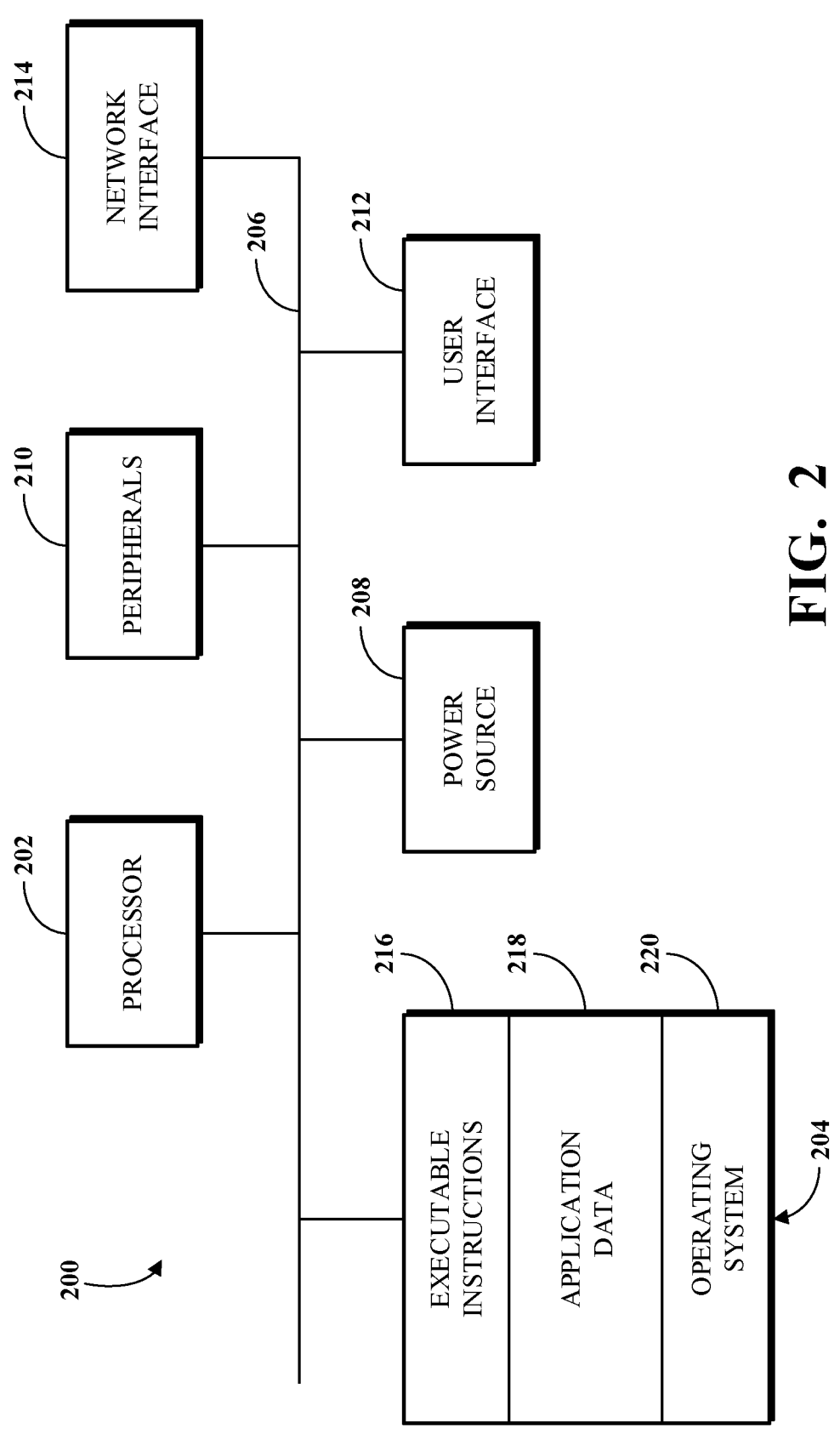
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
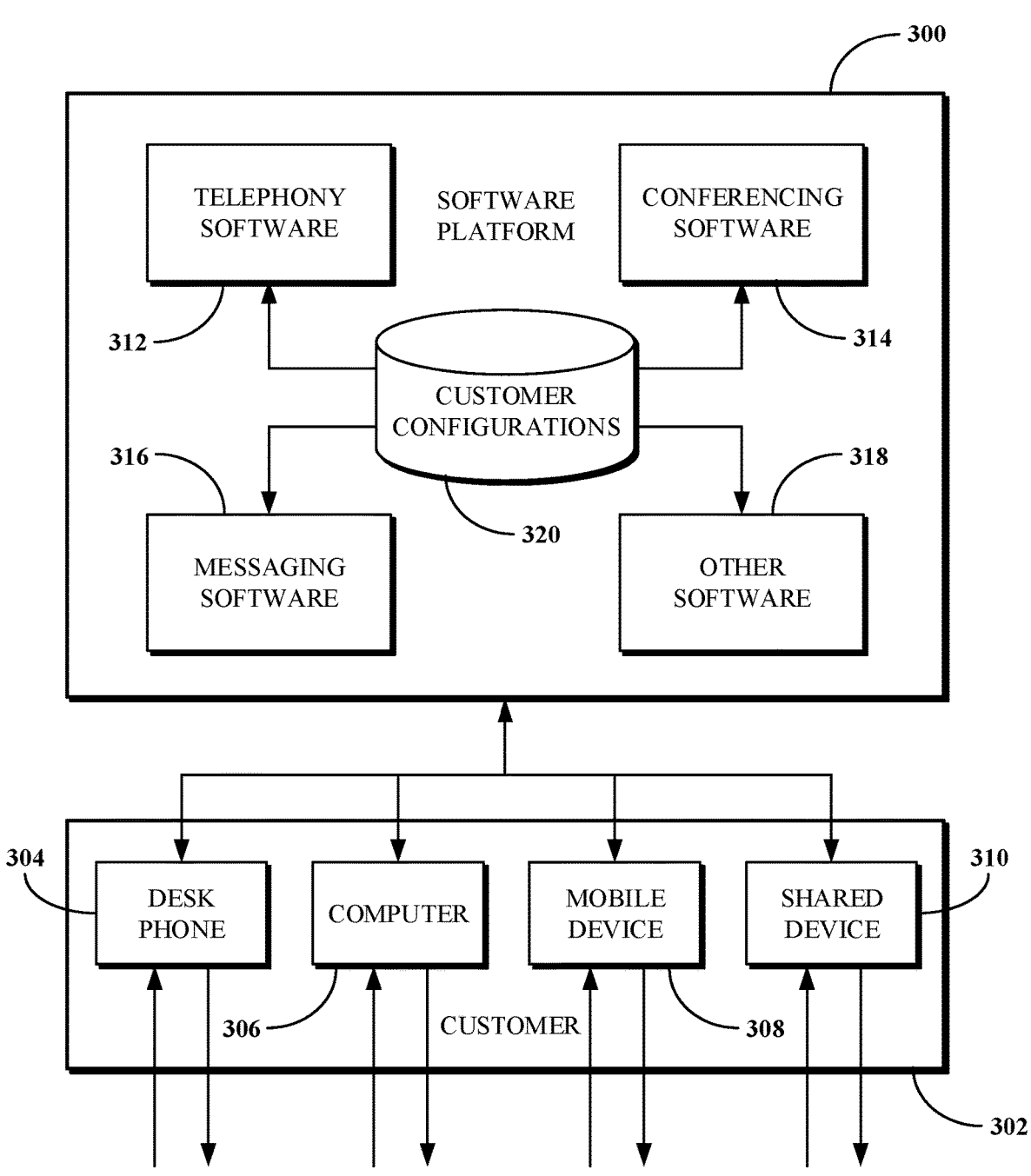
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format. The other software 318 enables other functionality of the software platform 300. Examples of the other software 318 include, but are not limited to, device management software, resource provisioning and deployment software, administrative software, third party integration software, and the like. In one particular example, the other software 318 can include virtual background auto-correction software for detecting a participant in a video stream captured at a participant device during a video conference, determining a lighting level for the participant, adjusting, based on the lighting level for the participant, a lighting level of a virtual background used by the participant during the video conference, and outputting, during the video conference, an adjusted video stream including the adjusted virtual background for rendering within a user interface of software associated with the video conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
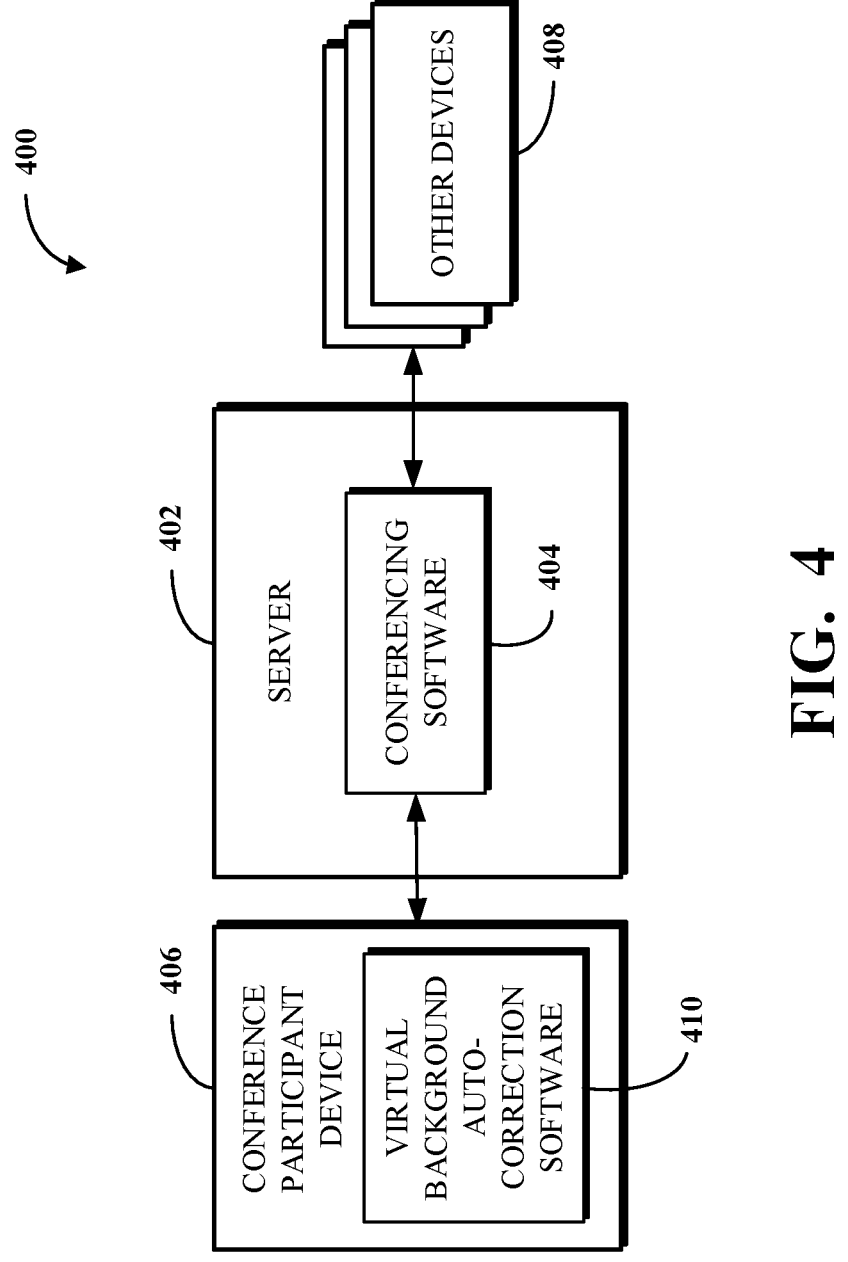
FIG. 4 is a block diagram of an example of a client-side system for auto-correction of virtual backgrounds used with a participant device connected to a conference.

FIG. 4 is a block diagram of an example of a client-side system 400 for auto-correction of virtual backgrounds used with a participant device connected to a conference. The system 400 includes a server 402 which runs conferencing software 404. The conferencing software 404 implements a conference between operators of multiple devices, as conference participants, and may, for example, be the conferencing software 314 shown in FIG. 3. As shown, the conferencing software 404 implements a conference between an operator of a conference participant device 406 and operators of one or more other devices 408. In some implementations, the conference participant device 406 runs virtual background auto-correction software 410. That is, the virtual background auto-correction software 410 can be a client-side function. In an example, the one or more other devices 408 may be other conference participant devices. Some or all of the conference participant device 406 and the other devices 408 may each be a client device such as one of the clients 304 through 310 shown in FIG. 3 which accesses the conferencing software 404 using a client application. Alternatively, some or all of the conference participant device 406 and the other devices 408 may each be a non-client device which accesses the conferencing software 404 other than by using a client application.

The virtual background auto-correction software 410 may provide the operator of a conference participant device 406 a virtual background auto-correction enable button on a user interface (e.g., a graphical user interface of a client application which connects to the conferencing software 404). For example, interaction with such a button may allow a video stream from the conference participant device 406 to be processed to adjust for mismatched lighting levels between a foreground of the video stream (e.g., the conference participant) and a virtual background. In some implementations, the virtual background auto-correction software 410 may be enabled as part of a default configuration.

Based on virtual background auto-correction enablement or default configuration settings, the virtual background auto-correction software 410 can receive the video stream from the conference participant device 406. In some implementations, the virtual background auto-correction software 410 may receive the video stream from camera software running on the conference participant device 406, a client application (running on the conference participant device 406) which interfaces with a camera, or combinations thereof. The video stream can be analyzed to determine differences in lighting levels between the foreground and the virtual background. The lighting levels of the virtual background can be adjusted to match the lighting levels of the foreground. A match can result when the lighting levels of the virtual background meet or are within a range of the lighting levels of the foreground. In some implementations, the range is a default value, a configurable value, or combinations thereof. The matching can be done, for example, by adjusting one or more virtual background parameters, including but not limited to, exposure, brightness, contrast, and ISO. In some implementations, the lighting levels of the foreground and the lighting levels of the virtual background can be adjusted based on defined aesthetics settings. For example, the defined aesthetics settings may define lighting level ranges for the foreground which are associated with an aesthetically pleasing presentation within a user interface of the conferencing software 404. The virtual background auto-correction software 410 provides the adjusted video stream to the client application (running at the conference participant device 406) which transmits it to the conferencing software 404, which causes client applications connected to the conferencing software 404 to render the adjusted video stream on a user interface on respective devices, for example, the conference participant device 406, the other devices 408, or combinations thereof. As a result, the presentation of the adjusted video stream is lighting level balanced, i.e., aesthetically pleasing with respect to the lighting levels of the foreground and the lighting levels of the virtual background. In some implementations, the virtual background auto-correction software 410 can dynamically or automatically adjust the lighting levels of the virtual background and, if applicable, the lighting levels of the foreground, based on changed lighting conditions that may occur in the foreground during the conference.

In some implementations, the virtual background auto-correction software 410 can receive device settings from the conference participant device 408. For example, the device settings can include, but is not limited to, which virtual background is being used, camera settings, video settings, and combinations thereof. For example, the device settings can be received at the start of a conference session. The device settings can be used to proactively set or perform virtual background adjustment. The virtual background auto-correction software 410 can use machine learning techniques to establish virtual background adjustment patterns based on the device settings used in previous sessions. This can be done without reference to an incoming video stream. That is, virtual background adjustment can be done, prior to video streaming, based on virtual background adjustment patterns learned from previous sessions. In some implementations, the virtual background adjustments can be made during the video conference, i.e., reactive to changes in the device configuration.

In some implementations, the virtual background auto-correction software 410 can receive presentation settings or a presentation configuration from the conference participant device 408. For example, the presentation settings can include, but is not limited to, where a presentation is being made, what type of room, what type of environment, and combinations thereof. For example, the presentation settings can be received at the start of a conference session. The presentation settings can be used to proactively set or perform virtual background adjustment. The virtual background auto-correction software 410 can use machine learning techniques to establish virtual background adjustment patterns based on the presentation settings used in previous sessions. This can be done without reference to an incoming video stream. That is, virtual background adjustment can be done, prior to video streaming, based on virtual background adjustment patterns learned from previous sessions. In some implementations, virtual background adjustments, foreground adjustments, and combinations thereof can be made to proactively set lighting levels for the presentation settings. In some implementations, the virtual background adjustments, foreground adjustments, and combinations thereof can be made during the video conference, i.e., reactive to changes in the presentation configuration.

In some implementations, the virtual background auto-correction software 410 can be implemented in the server 402. In some implementations, the conferencing software 404 may include the virtual background auto-correction software 410. In some implementations, the conferencing software 404 and the virtual background auto-correction software 410 may wholly or partially run on different servers. In these instances, the virtual background auto-correction software 410 can receive the video stream via the conferencing software 404. Adjusting of the lighting levels of the virtual background and the foreground, if applicable, can be performed by the virtual background auto-correction software 410. The adjusted video stream can be transmitted via the conferencing software 404 to a user interface of a client application running on a device of the participant, for example, the conference participant device 406, the operators of the other devices 408, or combinations thereof.

In some implementations, the system 400 can include a device (other than the participant device 406 and can be one of the other devices 408) which can perform the automatic adjustment of the virtual background. The device can receive the video stream via the conferencing software 404, balance the lighting levels with respect to the virtual background and the foreground, and output a video stream including an adjusted virtual background to a user interface of a client application running on a device of the participant, for example, the conference participant device 406, the operators of the other devices 408, or combinations thereof.

Figure 5:
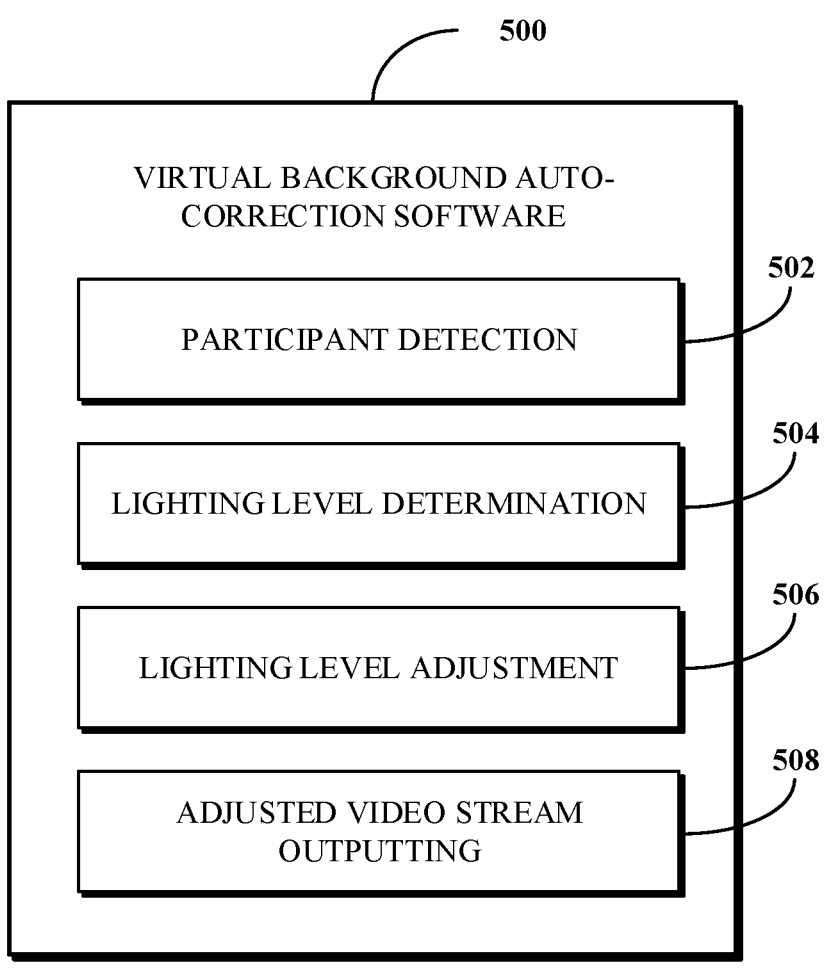
FIG. 5 is a block diagram of example functionality of virtual background auto-correction software.

FIG. 5 is a block diagram of example functionality of virtual background auto-correction software 500, which may, for example, be the virtual background auto-correction software 410 shown in FIG. 4. The virtual background auto-correction software 500 includes tools, such as programs, subprograms, functions, routines, subroutines, operations, and/or the like for determining a foreground in a video stream for a participant in a conference (e.g., a video conference, Internet based conference, webinar, teleconference, web conferencing, or online conference), determining lighting levels for the foreground and a virtual background, adjusting the lighting level of the virtual background to match the lighting level of the foreground, and outputting the adjusted video stream to the participant during the conference. As shown, the virtual background auto-correction software 500 includes a participant detection tool 502, a lighting level determination tool 504, a lighting level adjustment tool 506, and an adjusted video stream outputting tool 508.

The participant detection tool 502 receives a participant video stream from participant device, such as the participant device 406 in FIG. 4. The participant video stream includes a composite foreground and virtual background. The participant detection tool 502 detects a participant from the participant video stream. A region identified with the detected participant is denoted the foreground. In some implementations, the participant detection tool 502 can detect the participant using object detection. In some implementations, the participant detection tool 502 can detect facial features of the participant using the object detection. For example, object detection can be done using computer vision techniques, deep learning techniques, machine learning techniques, and combinations thereof. In some implementations, the participant detection tool 502 can detect multiple participants in the participant video stream. In some implementations, the participant detection tool 502 may be or may use a machine learning model that is trained to identify a portrait (e.g., body definition, contour) of a user, who may be facing a camera. In an example, the participant detection tool 502 may use a service (e.g., a cloud-based service) to obtain the foreground. In some implementations, the multiple participants can be treated as a single foreground. In some implementations, each of the multiple participants can be treated as a separate foreground. For example, a first foreground and a second foreground. In this instance, the participant detection tool 502 can divide the virtual background into an appropriate number of regions, each corresponding to one of the multiple foregrounds.

The light level determination tool 504 determines a lighting level for the foreground and a lighting level of the virtual background. In some implementations, the lighting level of the foreground is an average of lighting levels of pixels comprising the foreground. In some implementations, the lighting level of the virtual background is an average of lighting levels of pixels comprising the virtual background. In some implementations, a histogram can be generated for the foreground and for the virtual background. For example, the lighting level for each pixel in the foreground and the virtual background can be used to generate the histogram. A metric based on the histogram can be used to determine the lighting level for the foreground and the virtual background. For example, the lighting level can be the most frequent lighting level in the histogram. In another example, the lighting level can be an average based on the histogram. In some implementations, a spatial distribution can be generated for the foreground and for the virtual background. For example, the lighting level for each pixel in the foreground and the virtual background can be used to generate the spatial distribution. A metric based on the spatial distribution can be used to determine the lighting level for the foreground and the virtual background. For example, the lighting level can be an average of the lighting levels associated with pixels on a respective border between the foreground and the virtual background. In another example, the lighting level can be a weighted average of lighting levels, where the lighting levels associated with pixels on a respective border between the foreground and the virtual background are weighted more heavily. In some implementations, an initial virtual background histogram or spatial distribution can be stored as part of the virtual background information. That is, the virtual background histogram or spatial distribution is a default set of lighting levels. Other representations and metrics can be used without departing from the scope of this disclosure.

The lighting level adjustment tool 506 adjusts the lighting levels determined for the virtual background to match the lighting determined for the foreground. The matching can be done by adjusting one or more virtual background parameters, including but not limited to, exposure, brightness, contrast, and ISO level. In an example, an entirety of the virtual background is adjusted to match the foreground. This can be a default configuration as it provides consistent lighting levels across both the virtual background and the foreground. In another example, lighting levels of virtual background pixels or regions proximate the foreground are adjusted to match the lighting levels of the foreground. In this instance, use of processing resources is minimized by changing the more relevant portions of the virtual background.

In some implementations, the lighting level adjustment tool 506 can determine lighting directionality based on the foreground spatial distribution. For example, the foreground spatial distribution can indicate pixels or regions which are light or bright in contrast to pixels or regions which are dark. This can be used to indicate where light is coming from and in what direction. The lighting level adjustment tool 506 can then adjust the virtual background lighting levels to follow the determined light direction. For example, pixels or regions in the virtual background are adjusted based on their proximity to the determined light source and lighting direction. This can provide a seamless transition with respect to the lighting as between the virtual background and the foreground.

In some implementations, the lighting level adjustment tool 506 can determine whether one or pixels of the detected facial features are in the shadows based on the spatial distribution, the lighting direction, and combinations thereof. For example, the foreground spatial distribution and lighting direction can indicate facial feature pixels or regions which are darker in contrast to adjoining facial feature pixels or regions, i.e., are in shadow areas. The lighting level adjustment tool 506 can then adjust the facial feature pixels or regions which are in the shadows.

In some implementations, the lighting level adjustment tool 506 can adjust the foreground lighting levels based on thresholds for video quality. For example, the foreground may not be aesthetically pleasing because the foreground lighting level is too dark or too bright based on, but not limited to, a default threshold, one or more video stream characteristics, or combinations thereof. The foreground lighting levels are adjusted to match the thresholds. The matching can be done by adjusting one or more foreground parameters, including but not limited to, exposure, brightness, contrast, and ISO level. The lighting level adjustment tool 506 can then adjust the virtual background as described herein.

In some implementations, lighting level adjustment tool 506 can adjust the foreground lighting levels and the adjusted virtual background based on thresholds for video quality. For example, the foreground, the adjusted virtual background, or combinations thereof may not be aesthetically pleasing because the foreground lighting level, the adjusted virtual background, or combinations thereof is too dark or too bright. The foreground lighting levels, the adjusted virtual background lighting levels, or combinations thereof are adjusted to match the thresholds. The matching can be done by adjusting one or more foreground or virtual background parameters, respectively, including but not limited to, exposure, brightness, contrast, and ISO level.

The adjusted video stream outputting tool 508 outputs the adjusted video stream along with instructions, commands, or other information configured to cause the device of the participant(s) to output the adjusted video stream to the participant(s) during the conference, where the adjusted video stream is produced from the adjusted virtual background and the foreground (or adjusted foreground when appropriate). However, in some cases, the adjusted video stream outputting tool 508 outputs those instructions, commands, or other information to a secondary device associated with the participant(s). For example, in a hybrid online classroom setting, a video stream may be captured at first device of a participant and adjusted as described in this disclosure. The adjusted video stream may be output at the first device and at a second device connected to the first device. The second device, for example, can be a large screen display connected to the first device.

Although the tools 502 through 508 are shown as functionality of the virtual background auto-correction software 500 as a single piece of software, in some implementations, some or all of the tools 502 through 508 may exist outside of the virtual background auto-correction software 500 and/or the software platform may exclude the virtual background auto-correction software 500 while still including the some or all of tools 502 through 508 in some form elsewhere.

Figure 6:
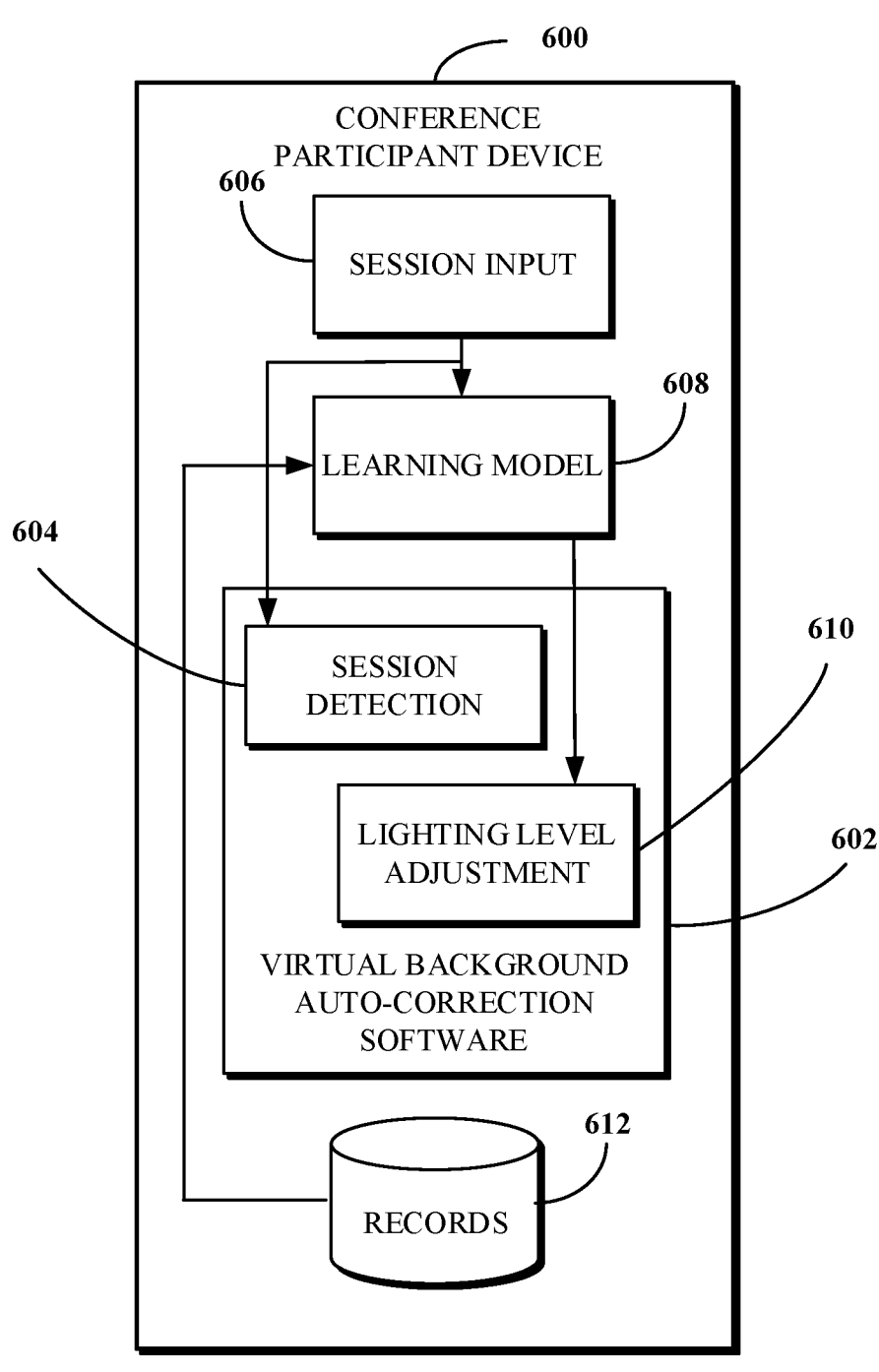
FIG. 6 is a block diagram of an example of virtual background auto-correction based on session input received from a participant device connected to a conference.

FIG. 6 is a block diagram of an example of virtual background auto-correction based on session input received from a conference participant device connected to a conference. As shown, a conference participant device 600 runs virtual background auto-correction software 602 which includes a session detection tool 604. The session detection tool 604 detects the initiation or start of a conference based on session input 606 received from the conference participant device 600 connected to the conference. For example, the conference participant device 600 and the virtual background auto-correction software 602 may, respectively, be the conference participant device 406 and the virtual background auto-correction software 410 shown in FIG. 4.

In particular, the session input 606 can be received by the session detection tool 604 when a conference participant associated with the conference participant device 600 initiates a conference using participant conference configuration data, where the conference participant configuration data includes, but is not limited to, audio settings, microphone settings, video settings, and a virtual background. In some implementations, the conference participant can select a defined conference participant configuration data from multiple conference participant configuration data can be saved on the conference participant device 600. The session input 606 can include a session initiation or control signal and the conference participant configuration data.

Assuming that a session initiation signal is received by the session detection tool 604, the session input 606 is then processed using a learning model 608 to determine the virtual background parameters based on virtual background adjustment patterns learned from previous sessions. The learning model 608 may be or include a neural network (e.g., a convolutional neural network, recurrent neural network, or other neural network), decision tree, vector machine, Bayesian network, genetic algorithm, deep learning system separate from a neural network, or another machine learning model. The learning model 608 is trained to identify virtual background adjustment patterns based on an initial virtual background and adjusted virtual background for different initial virtual backgrounds. Based on the learned virtual background adjustment patterns, the learning model 608 can output virtual background parameters for the virtual background present in the session input 606. The virtual background auto-correction software 602 also includes a lighting level adjustment tool 610. For example, the lighting level adjustment tool 610 may be the lighting level adjustment tool 506 of FIG. 5. The lighting level adjustment tool 610 receives the output of the learning model 608 and adjusts the virtual background accordingly.

Separately, to identify the virtual background adjustment patterns, the learning model 608 evaluates each virtual background against historical records 612 associated with the conference participant to determine what virtual background parameters have been used for previous virtual backgrounds which match or are near the virtual background in the session input 606. The historical records 612 may, for example, include data received from the virtual background auto-correction software 602 for virtual backgrounds, virtual background parameters, and adjusted virtual backgrounds performed on previous conferences.

In some implementations, the learning model 608 may be included in the virtual background auto-correction software 602. In some implementations, the historical records 612 may be located other than on the conference participant device 600 on which the virtual background auto-correction software 602 is partially or wholly run. For example, the historical records 612 may be located on a server or a companion device.

Figure 7:
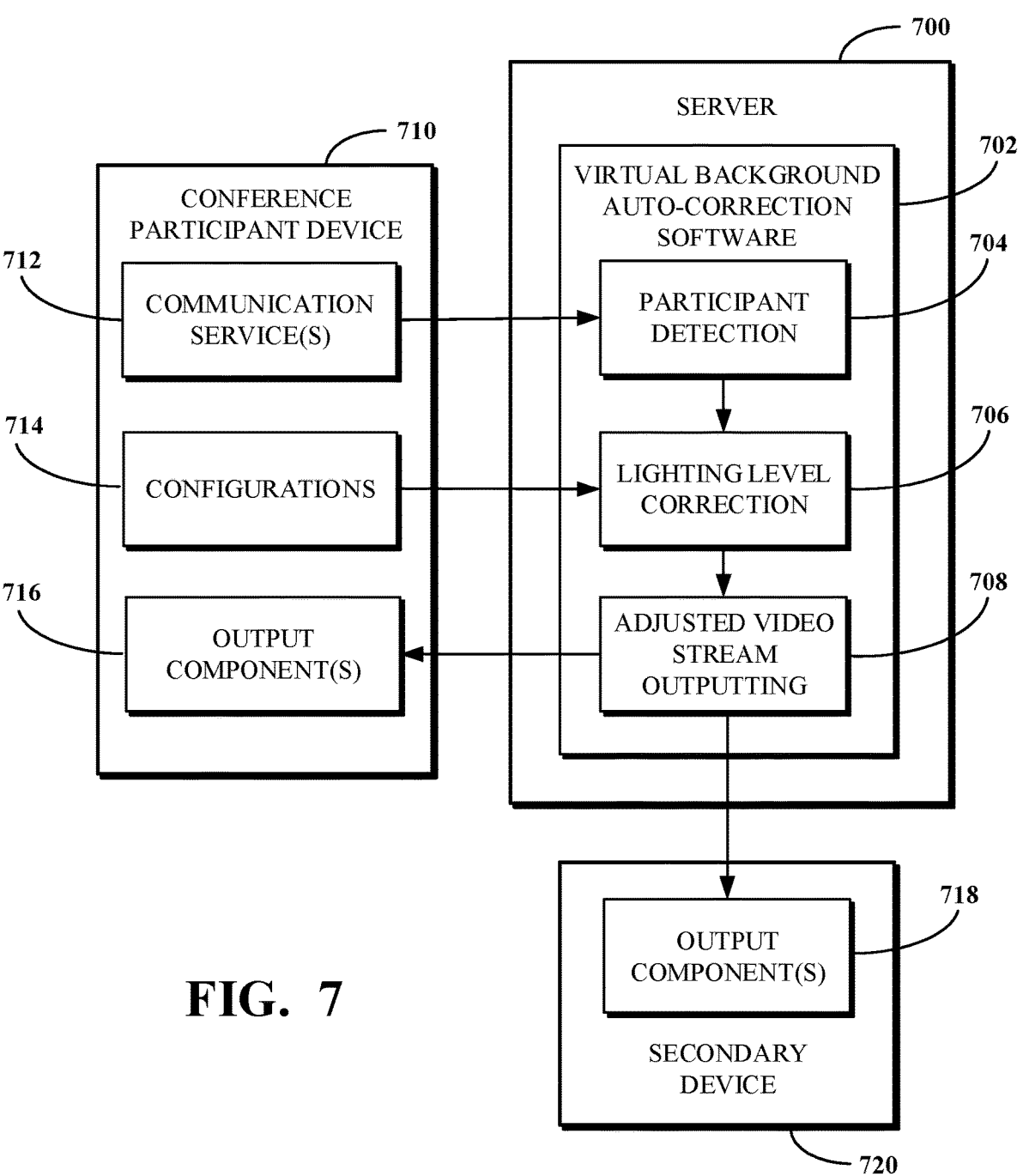
FIG. 7 is a block diagram of an example of a server-side system for auto-correction of virtual backgrounds used with a participant device connected to a conference.

FIG. 7 is a block diagram of an example of a server-side system for auto-correction of virtual backgrounds used with a participant device connected to a conference. As shown, a server 700 runs virtual background auto-correction software 702 which includes a conference participant detection tool 704, a lighting level correction tool 706, and an adjusted video stream outputting tool 708. The conference participant detection tool 704 determines a foreground based on detection of a conference participant in a video stream. The video stream may be a video stream. The lighting level correction tool 706 determines lighting levels for the foreground and a virtual background and adjustment parameters for appropriately matching the virtual background lighting level to the foreground lighting level. The adjusted video stream outputting tool 708 outputs the adjusted video stream to devices participating in the conference.

As an example, the server 700 may be the server 402 shown in FIG. 4. In another example, the virtual background auto-correction software 702 may functionally be the virtual background auto-correction software 410 shown in FIG. 4, the virtual background auto-correction software 500 of FIG. 5, or the virtual background auto-correction software 602 shown in FIG. 6, to the extent different. In yet another example, the conference participant detection tool 704, the lighting level correction tool 706, and the adjusted video stream outputting tool 708 may respectively be the participant detection tool 502, the lighting level determination tool 504, the lighting level adjustment tool 506, and the adjusted video stream outputting tool 508.

In particular, the conference participant detection tool 704 receives and processes the video stream to determine the foreground. For example, the conference participant detection tool 704 uses the video stream received from one or more communications service(s) 712 running on a conference participant device 710. For example, the conference participant device 710 can be the conference participant device 406 of FIG. 4 or the conference participant device 600 of FIG. 6. The communications services 712 include or capture communications to and from the conference participant device 710 and other devices. For example, the other devices can be the one or more other devices 408 of FIG. 4. These communications are used by the conference participant detection tool 704 to detect the conference participant in the video stream. The pixels or region associated with the conference participant is denoted as the foreground.

The lighting level correction tool 706 determines the lighting levels for the virtual background and the determined foreground. The lighting level correction tool 706 also adjusts the lighting level of the virtual background based on comparisons with the lighting levels of the foreground. In some implementations, the lighting levels of the determined foreground are adjusted to match aesthetic or video quality thresholds. In some implementations, the lighting level correction tool 706 can adjust the virtual background based on configuration data. For example, the lighting level correction tool 706 can use one or more configurations 714 of the conference participant device 710 to make such adjustments. The configurations 714 are or refer to settings of the conference participant device 710. For example, the configurations may include a conference participant configuration setting used by a conference participant when initiating a conference.

The adjusted video stream outputting tool 708 then causes a presentation of output to the conference participant or others of the adjusted video stream according to the corrections made by the lighting level correction tool 706. In particular, the adjusted video stream outputting tool 708 transmits instructions, commands, or other information configured to output the adjusted video stream to one or more output components 716 of the conference participant device 710 and/or other devices such as other devices 408 of FIG. 4. The output components 716 may, for example, include a display and/or an audio output device associated with the conference participant device 710 and/or other devices. In some implementations, the adjusted video stream outputting tool 708 may transmit instructions, commands, or other information configured to output the adjusted video stream to one or more output components 718 of a secondary device 720 associated with the conference participant. For example, the secondary device 720 may be another device through which the conference participant has accessed conferencing software used to implement the conference. In another example, the secondary device 720 may be another device registered to an account of the conference participant. In yet another example, the secondary device 720 may be another device detected on a same network to which the conference participant device 710 is connected. The output components 718 may, for example, include a display and/or an audio output device associated with the secondary device 720. The secondary device 720 may be a mobile device, such as a laptop, tablet, or mobile phone, augmented reality (AR) device, virtual reality (VR) device, or it may be a wearable device, such as a network-connected wristband, ring, or watch.

In some implementations, a device other than a participant device or the server may be used for auto-correction of virtual backgrounds of the participant device. For example, the device can be the secondary device 720. The device can receive the video stream, can detect the conference participant in the video stream using object detection, can determine a foreground and associated lighting level distribution, can determine a virtual background and associated lighting level distribution, can automatically adjust the virtual background to match the foreground (or can automatically adjust the foreground and then adjust the virtual background to match the adjusted foreground when appropriate), and can output an adjusted video stream including the adjusted virtual background within a participant tile of a conference implemented by a conferencing software.

In some implementations, a conference participant device, a server, or a device can implement or include a video messaging application or service. The video messaging application allows participants to record video messages for themselves, others, or combinations thereof. A virtual background auto-correction software implemented along with the video messaging application or on another device can auto-correct a virtual background as the video recordings are performed in real-time (i.e., during the video recording). For example, a participant can select a virtual background in preparation for recording a video message. In some implementations, the virtual background auto-correction software can adjust the lighting level of the selected virtual background based on a device configuration for a device being used for the video recording. This adjustment can happen prior to starting the video message recording. After the video message recording process has started, the virtual background auto-correction software can detect the participant recording the video message in the video stream, i.e., foreground detection. The lighting level of the foreground and the lighting level of the virtual background are determined. The virtual background auto-correction software can adjust the determined lighting level of the virtual background to match the determined lighting level of the foreground. This adjustment can be performed dynamically throughout or during the video message recording process to account for any lighting level changes in the foreground.

Figure 8:
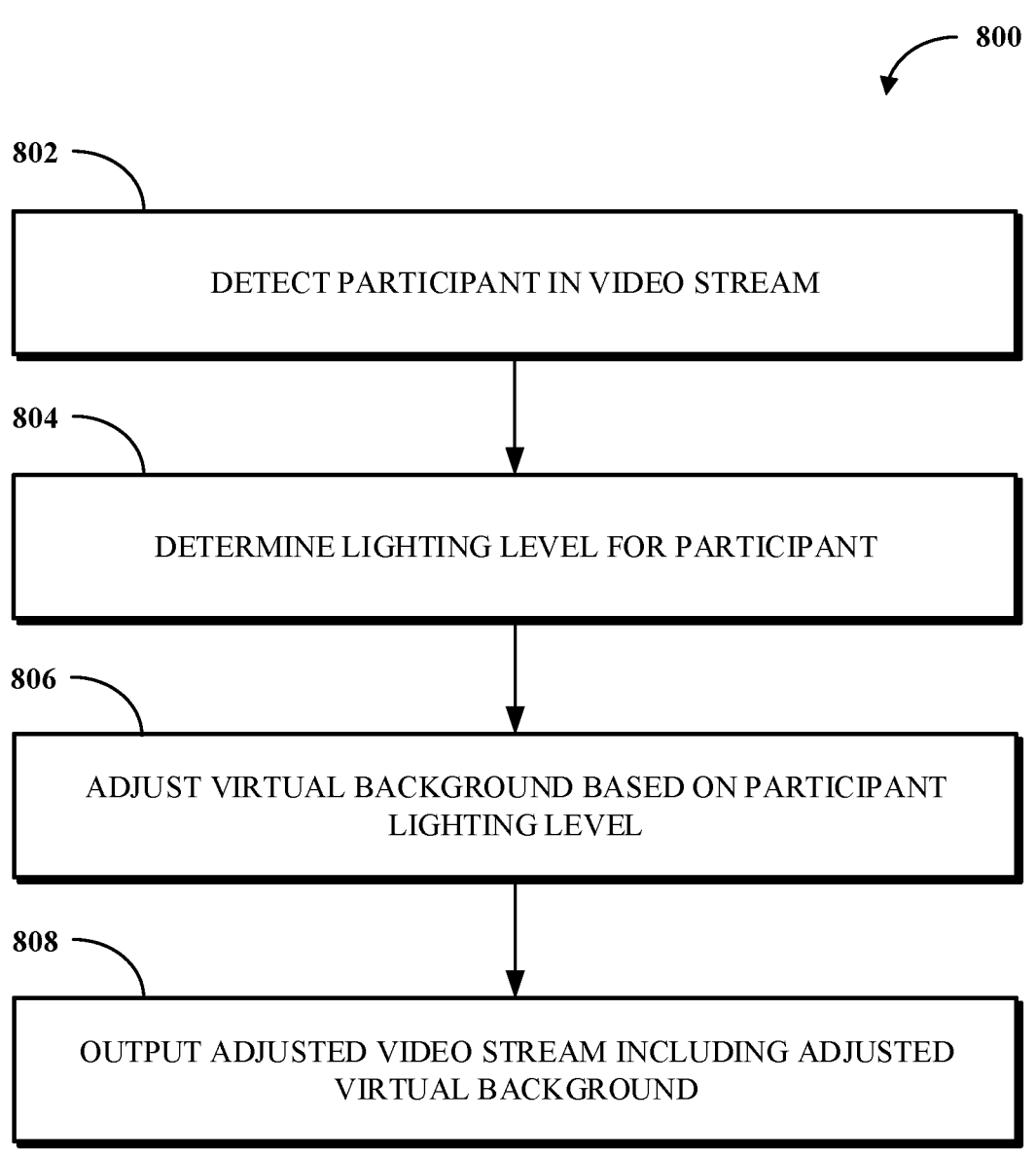
FIG. 8 is a flowchart of an example of a technique for virtual background auto-correction.

To further describe some implementations in greater detail, reference is next made to examples of techniques which may be performed by or using a system for virtual background auto-correction. FIG. 8 is a flowchart of an example of a technique 800 for virtual background auto-correction. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a participant is detected in a video stream. The video stream is received from a device associated with the participant. In some implementations, the device can include the virtual background auto-correction software for processing the video stream, i.e., it is a client-side implementation. In some implementations, a server can receive the video stream from the device, where the server can include the virtual background auto-correction software for processing the video stream, i.e., it is a server-side implementation. For example, the video stream can be from a conference to which the device is connected. In another example, the video stream can be from an on-going video message recording session. The video stream is processed to determine the participant in the video stream. The processing can include, but is not limited, to using object detection to detect the participant. The pixels or regions associated with the detected object may be denoted as the foreground. In some implementations, the participant and the virtual background are non-overlapping. In some implementations, the participant can include multiple separate participants. For example, the video stream may include two or more participants who are in a field of view of an imaging device associated with the device.

At 804, a lighting level is determined for the participant. A lighting level, such as an exposure, for example, can be determined for the participant using a variety of techniques. For example, a histogram can be generated to determine a number of occurrences for different lighting levels associated with the participant. Any of a number of metrics associated with the histogram can be used to determine the lighting level for the participant. In another example, a spatial distribution can be generated to see the position of bright and light pixels. This can then be used to weight pixels differently based on a proximity to the virtual background. A lighting level for the participant can be determined based on averaging the lighting levels for the weighted pixels. In yet another example, the lighting level of the participant can be based solely on pixels proximate the virtual background. In some implementations, lighting levels can be determined for different pixels or regions of the participant. For example, one region may be bright while another region may be light. Each region can then be associated with its own lighting level. A lighting level for the virtual background can be similarly determined. In some implementations, upon initiation of a conference, webinar, class, or video recording session and prior to receiving the video stream, the virtual background can be automatically adjusted based on output from a learning model.

At 806, the virtual background lighting level can be adjusted based on the participant lighting level. One or more virtual background parameters, including but not limited to, exposure, brightness, contrast, and ISO level, can be adjusted to match the participant lighting level. The adjustment can be made to portions or all of the virtual background. For example, the portions can be virtual background pixels or regions proximate to the participant. In some implementations, lighting directionality can be used to adjust the virtual background to provide a graded or shaded adjustment. In some implementations, the participant lighting levels can be adjusted to match video quality thresholds. This adjustment can be prior to virtual background adjustment. Alternatively, this adjustment can be made to the participant light levels and to the adjusted virtual background.

At 808, the adjusted video stream is output. The adjusted video stream can be generated by overlaying the foreground (adjusted foreground when applicable) on the adjusted virtual background to produce a composite image, which is output as part of an adjusted video stream. For example, the adjusted video stream is output to one or more output devices of a device associated with the participant. In another example, the adjusted video stream including the adjusted virtual background is output for rendering within a user interface of conferencing software used to implement a video conference. In yet another example, the adjusted video stream including the adjusted virtual background is output for rendering within a participant tile of software associated with a video conference. In some implementations, the adjusted video stream is output to a secondary device associated with the participant. In some such implementations, the secondary device may be identified as part of the process for presenting the adjusted video stream. The secondary device may be a mobile device or a wearable device. In some implementations, the adjusted virtual background is dynamically updated or re-adjusted based on one or more participant lighting levels during the conference.

Some implementations may include a method that includes detecting a participant in a video stream captured at a participant device during a video conference. The method may include determining a lighting level for the participant. The method may include adjusting, based on the lighting level for the participant, a lighting level of a virtual background used by the participant during the video conference. The method may include outputting, during the video conference, an adjusted video stream including the adjusted virtual background for rendering within a user interface of software associated with the video conference. In one or more implementations, the virtual background is dynamically adjusted based on one or more participant lighting levels during the video conference. In one or more implementations, the method may include adjusting the lighting level of the participant based on one or more video quality thresholds. In one or more implementations, the method may include adjusting the lighting level of the participant based on one or more video quality thresholds. In one or more implementations, the method may include adjusting the lighting level of the virtual background based on the adjusted lighting level of the participant. In one or more implementations, the method may include generating a participant histogram of the lighting level of the participant. In one or more implementations, the method may include generating a virtual background histogram of the lighting level of the virtual background. In one or more implementations, the method may include comparing the participant histogram with the virtual background histogram to determine amount of lighting level adjustment. In one or more implementations, the method adjusting, based on the lighting level for the participant, a lighting level of a virtual background used by the participant during the video conference may include adjusting one or more virtual background parameters. In one or more implementations, the method the one or more virtual background parameters includes exposure, brightness, contrast, and International Organization for Standardization level. In one or more implementations, the adjusting, based on the lighting level for the participant, a lighting level of a virtual background used by the participant during the video conference may include determining a lighting directionality for the participant. In one or more implementations, the method may include applying the lighting directionality to the virtual background. In one or more implementations, the method may include proactively setting one or more lighting levels of the virtual background using a machine learning model upon recognition of a participant configuration. In one or more implementations, the method may include adjusting the lighting level of the participant and the adjusted virtual background based on one or more video quality thresholds. In one or more implementations, the lighting level of the participant is an average of lighting levels of pixels comprising the participant. In one or more implementations, the lighting level of the participant is an average of lighting levels of pixels comprising a border of the participant.

In some implementations, an apparatus may include a memory and a processor. The processor is configured to execute instructions stored in the memory to detect a participant in a video stream captured at a participant device during a video conference, determine a lighting level for the participant, adjust, based on the lighting level for the participant, a lighting level of a virtual background used by the participant during the video conference, and output, during the video conference, an adjusted video stream including the adjusted virtual background for rendering within a user interface of software associated with the video conference. In one or more implementations, the processor may be configured to generate a spatial distribution of the lighting level of the participant. In one or more implementations, the processor may be configured to use the spatial distribution to adjust the virtual background. In one or more implementations, the processor may be configured to determine virtual background regions proximate to the participant. In one or more implementations, the processor may be configured to adjust, based the lighting level for the participant, lighting levels for the virtual background regions. In one or more implementations, the lighting level of the participant is a weighted average based on proximity to the virtual background.

Some implementations may include a non-transitory computer-readable storage device that includes program instructions. The program instructions may be executed by a processor that cause the processor to perform operations. The operations may include detecting a participant in a video stream captured at a participant device during a video conference, determining a lighting level for the participant, adjusting, based on the lighting level for the participant, a lighting level of a virtual background used by the participant during the video conference, and outputting, during the video conference, an adjusted video stream including the adjusted virtual background for rendering within a user interface of software associated with the video conference. In one or more implementations, the operations may include initiating detection of the participant upon receiving an enablement notification. In one or more implementations, the operations may include generating a participant histogram of the lighting level of the participant. In one or more implementations, the operations may include setting the lighting level of the participant to a most frequent lighting level in the participant histogram. In one or more implementations, the operations may include setting the lighting level of the participant to an average of lighting levels for regions proximate to the virtual background.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

detecting, by a first device, a participant in a video stream;

determining, by the first device, a lighting directionality for the participant based on exposure information from pixels in a pixel distribution proximate to a virtual background used by the participant during the video stream;

adjusting, automatically by the first device, the virtual background based on the lighting directionality to generate an adjusted virtual background; and outputting, by the first device, an adjusted video stream including the adjusted virtual background for display at a second device.

2. The method of claim 1, wherein determining a lighting directionality for the participant based on a pixel distribution of the participant in the video stream further comprising:

determining a light pixel distribution of the participant in the video stream.

3. The method of claim 1, wherein determining a lighting directionality for the participant based on a pixel distribution of the participant in the video stream further comprising:

determining a dark pixel distribution of the participant in the video stream.

4. The method of claim 1, wherein determining a lighting directionality for the participant based on a pixel distribution of the participant in the video stream further comprising:

determining a light pixel distribution and a dark pixel distribution of the participant in the video stream.

5. The method of claim 1, wherein determining a lighting directionality for the participant based on a pixel distribution of the participant in the video stream further comprising:

determining a bright pixel distribution and a dark pixel distribution of the participant in the video stream.

6. The method of claim 1, wherein determining a lighting directionality for the participant based on a pixel distribution of the participant in the video stream further comprising:

determining a lighting level pixel distribution and a dark pixel distribution of the participant in the video stream.

7. The method of claim 1, wherein determining a lighting directionality for the participant based on a pixel distribution of the participant in the video stream further comprising:

determining a spatial pixel distribution and a dark pixel distribution of the participant in the video stream.

8. The method of claim 1, further comprising:

dynamically applying the lighting directionality to the virtual background during the video stream.

9. An apparatus, comprising:

a memory; and a processor configured to execute instructions stored in the memory to:

detect a participant in a video stream;

determine a lighting directionality for the participant based on exposure information from pixels in a pixel distribution proximate to a virtual background used by the participant during the video stream;

adjust, automatically, the virtual background based on the lighting directionality to generate an adjusted virtual background; and output an adjusted video stream including the adjusted virtual background for display at a device.

10. The apparatus of claim 9, wherein the processor is configured to execute the instructions to:

generate the pixel distribution from a spatial distribution of light pixels.

11. The apparatus of claim 9, wherein the processor is configured to execute the instructions to:

generate the pixel distribution from a spatial distribution of dark pixels.

12. The apparatus of claim 9, wherein the processor is configured to execute the instructions to:

generate the pixel distribution from a spatial distribution of dark pixels and light pixels.

13. The apparatus of claim 9, wherein the processor is configured to execute the instructions to:

generate the pixel distribution from a spatial distribution of lighting levels of pixels.

14. The apparatus of claim 9, wherein the processor is configured to execute the instructions to:

provide a graded or shaded adjustment to the virtual background by application of the lighting directionality.

15. A non-transitory computer-readable medium storing instructions operable to cause one or more processors to perform operations comprising:

detecting, by a first device, a participant in a video stream;

determining, by the first device, a lighting directionality for the participant based on exposure information from pixels in a pixel distribution proximate to a virtual background used by the participant during the video stream;

adjusting, automatically by the first device, the virtual background based on the lighting directionality to generate an adjusted virtual background; and outputting, by the first device, an adjusted video stream including the adjusted virtual background for display at a second device.

16. The non-transitory computer-readable medium of claim 15, wherein the processor is configured to execute the instructions to perform operations comprising:

initiating detection of the participant upon receiving an enablement notification.

17. The non-transitory computer-readable medium of claim 15, wherein the processor is configured to execute the instructions to perform operations comprising:

generating the pixel distribution from a spatial distribution of pixel lighting levels.

18. The non-transitory computer-readable medium of claim 15, wherein the processor is configured to execute the instructions to perform operations comprising:

providing a seamless transition between the participant and the virtual background by application of the lighting directionality.

19. The non-transitory computer-readable medium of claim 15, wherein the processor is configured to execute the instructions to perform operations comprising:

generating the pixel distribution by comparing which pixels are light and which pixels are dark.

20. The non-transitory computer-readable medium of claim 15, wherein the processor is configured to execute the instructions to perform operations comprising:

generating the pixel distribution by comparing which regions are light and which regions are dark.

* * * * *